March 9, 1965 H. L. PIERCE 3,172,752
ARTICLE OF MANUFACTURE FOR CONTROLLED RELEASE OF AN
ACTIVE AGRICULTURAL SUBSTANCE
Filed Dec. 12, 1961 3 Sheets-Sheet 1

FIG. 1

INVENTOR.
HAROLD LADD PIERCE
BY
ATTORNEY

FIG. 2.

March 9, 1965 H. L. PIERCE 3,172,752
ARTICLE OF MANUFACTURE FOR CONTROLLED RELEASE OF AN
ACTIVE AGRICULTURAL SUBSTANCE
Filed Dec. 12, 1961 3 Sheets-Sheet 3

INVENTOR.
HAROLD LADD PIERCE
BY
ATTORNEY.

United States Patent Office 3,172,752
Patented Mar. 9, 1965

3,172,752
ARTICLE OF MANUFACTURE FOR CONTROLLED RELEASE OF AN ACTIVE AGRICULTURAL SUBSTANCE
Harold Ladd Pierce, 3541 Yorkshire, Pasadena, Calif.
Filed Dec. 12, 1961, Ser. No. 162,629
4 Claims. (Cl. 71—62)

My present invention relates to materials used for assisting plant growth, including micronutrients, soil amendment materials, herbicides, fungicides and insecticides, and it relates particularly to a new combination of one or more of these active materials suspended in a holding material, the combination being coated onto and impregnated into the microscopically irregular and porous surfaces of a multiplicity of expanded perlite particles, whereby large quantities of the active and holding materials are intimately and tightly retained on the perlite particles, and the active materials are released to the soil at a controlled rate, and the present invention also relates to methods of making these new combinations of active materials and holding materials.

A considerable percentage of prior art micronutrients, soil amendment materials, insecticides, fungicides and herbicides were wasted after being applied to the soil of plants by being washed away by rain or by irrigation water. Also, the more finely powdered of these materials tended to be either blown away or unevenly redistributed by wind.

Once prior art micronutrients, soil amendment materials, herbicides, fungicides, insecticides and the like were distributed on the ground, the rate at which they were applied to the plant roots was controlled primarily by the amount of moisture in the soil, the pH of the soil and by the amount and distribution of these materials; thus, for a given amount of these prior art active materials and the desired amount of moisture to cause the best plant growth, the rate at which the active materials were available for use in plant growth or plant protection from parasites could not be controlled to any degree. For example, the rate at which micronutrients or soil amendment materials were absorbed into the soil and distributed to the plant roots could not be controlled. Further, if large quantities of such prior art active materials were applied in attempts to stimulate plant growth over an extended period, large portions of the active materials would be wasted by being dissolved and washed away soon after they were applied, and very little would be available to the plants after the passage of a short period of time. Therefore, the cost of the expensive materials would be prohibitive.

Another problem in connection with prior art micronutrients, soil amendment materials, insecticides, herbicides and fungicides and the like was that many of these active materials, and particularly concentrates thereof, had to be used with extreme care, in order to prevent burning of the plants. Large quantities of concentrates could not be used to lengthen the effective time over which these active materials would operate without causing serious injury to or complete destruction of the plants.

In many places an alkaline or an acid soil condition prevents micronutrients and other soil amendment materials from reaching plants or being properly utilized by plants. The mere addition of a neutralizing chemical to the soil is generally not satisfactory and does not stabilize the soil for a sufficient time.

Attempts have been made in the prior art to control the release of active materials to the soil for availability to plants at a useful rate. One prior art process involved the coating of the active materials in a binder onto dense rock or rock-like particles such as greystone, quartz or brick, but this presented so many new problems as to be of relatively little benefit. Among other things, such rock-like materials had relatively smooth and limited surfaces, limiting the amount of the coating and permitting the coating to readily flake or break off after only limited exposure to soil moisture; the heavy weight, relatively regular surfaces and heat dissipation characteristics of such rock-like particles prevented adequate coating and drying temperatures without damaging enzymes and hormones, and prevented adequate drying agitation for best coating; the heavy particle weight also made controlled distribution in the soil difficult, causing wastage of high-priced minerals and enzymes; direct fritting of micronutrients could not be applied to such rock-like particles due to the fact that so much time and churning were required to develop adequate heat for fritting that the coating would break or erode off during the attempt; and finally, the weight and conductivity of these heavy particles prevented electrostatic adhesion to plant leaves and stems which is the most effective way of distributing insecticides, herbicides and fungicides.

Another prior art attempt at controlled distribution took the form of carrier particles of porous materials which would soak up the active materials all the way through their structures. Such base particles included exfoliated vermiculite, feltable cellulose or leather fibers, talc, peat or the like. Generally, surface capillary of such base materials is minimal, and both coating materials and soil moisture would readily extend all the way through such base materials, as through the openings between the laminations in exfoliated vermiculite particles, further weakening the already weak structure so that it would readily crumble, making coating difficult and inadequate, and readily releasing the products to the soil in an uncontrolled manner, and losing the natural structural body which it is desirable to retain for beneficial perforation of the soil. Further, a fritted coating cannot be applied to such materials for the very slow release of micronutrients.

In view of these and other problems in the art, it is the primary object of the present invention to provide a new article of manufacture for assisting plant growth which includes an active material uniformly suspended in combination within a holding material, the active material comprising at least one substance which is active for improving plant growth selected from the group consisting of micronutrients, soil amendment materials, herbicides, fungicides and insecticides, and the holding material comprising hardened, continuous, slowly soluble material, and wherein this combination of active and holding materials is coated onto a multiplicity of expanded perlite particles having microscopically irregular and porous glassy surfaces of high capillary, the coating substantially completely covering the exposed surfaces of the perlite particles and substantially completely filling the pores of the perlite particles which communicate with the surfaces of the particles, whereby the resultant particles will tightly retain a large quantity of concentrated active material thereon for fully controlled soil distribution of the active material.

Another object of the invention is to provide a particulate article of manufacture of the character described having coated, expanded perlite base particles, wherein high concentrations of relatively fragile active components such as enzymes and hormones may be embodied in the coating without damage to such components.

A further object of the invention is to provide a particulate composition of the character described wherein the coating on the expanded perlite particles comprises a soluble frit fused directly to the large and irregular surfaces of the perlite particles and containing micronutrients.

A still further object of the present invention is to provide a novel particulate composition of the character described wherein thin section expanded perlite particles are coated with a dielectric holding material incorporating herbicides, fungicides or insecticides, or any combination of these, these particles being capable of receiving and sustaining an electrostatic charge which causes adherence thereof to plant leaf, stem or root structures.

It is also an object of my invention to provide novel methods for producing the coated perlite particles of the present invention for amending and improving soil and improving plant growth.

Other objects and advantages of my invention will be apparent from the following description and claims, the novelty consisting in the new combinations of materials and in the novel methods of making and using them, all as is more completely outlined herein and as is particularly pointed out in the appended claims.

In the accompanying drawings which form a part of this present application:

FIGURE 1 is a side elevation, partly in section, showing one embodiment of my apparatus for impregnating expanded perlite particles with my combination of holding and active materials;

FIGURE 2 is a side elevation, partly in section, showing a second embodiment of my apparatus for impregnating expanded perlite particles with my combinations of holding and active materials;

FIGURE 3 is a greatly enlarged sectional view of one of my particles comprising an expanded particle of perlite which has been coated with a combination of holding and active materials;

FIGURE 4 is a greatly enlarged sectional view of one of my particles like that shown in FIGURE 3 with an added outer coating of holding material; and FIGURE 5 is a sectional elevation of a tablet containing a mixture of my expanded perlite particles, active materials and holding material to which an outer coating of holding material has been applied.

Referring to FIGURE 1 of the drawings, I provide a storage bin 10 which contains raw ground perlite that is to be used in forming coated particles in the manner hereinbelow described.

The raw ground perlite is conveyed from storage bin 10 by conveyor 12 to a feeder 14 which may consist of an ordinary funnel. The output of feeder 14 drops into a classifier 16 which insures that only the correct particle sizes are processed, and classifier 16 conveys the raw ground perlite to a pre-heater unit 18. Pre-heater unit 18 heats the raw ground material for a sufficient time and at a sufficient temperature to drive off a portion of the combined water (sometimes referred to in the art as water of crystallization), or to generate gas pressure in bubbles within the material to be expanded. The pre-heating step preferably removes enough of the combined water to reduce the weight of the perlite by from about one-half to about two percent without any substantial expansion thereof, and to cause a substantial color change in the perlite. The temperature in the pre-heating zone is preferably between about 600° F. and about 1200° F., and the perlite preferably remains in this pre-heating zone for a period of time ranging from about one-half to about ten minutes, depending on the grain size and type of perlite.

The pre-heated perlite is then conveyed through a tube 19, which may be sealed, to an expander unit 20 in which the material is heated at a sufficient temperature and for a sufficient time to expand the individual particles thereof. The preferred expansion zone temperature is from about 1500° F. to about 2200° F., and the preferred time in the expansion zone is from about one second to about five seconds. If desired, the perlite may be cooled between the pre-heating and expansion stages, for transportation of the pre-heated perlite from a pre-heating station to an expanding station which is remote therefrom, or for any other desired reason. The heat is applied in expander unit 20 by means of a hot gas port 22 which blows a hot gaseous stream into expansion area 24 of expander unit 20. My process for pre-heating the perlite particles and then expanding them is fully described in my United States Letters Patent No. 2,501,962, issued March 28, 1950, for "Process for Expanding Earth Materials," upon which a reissue application is presently pending; and a preferred form of my apparatus for pre-heating and expanding the perlite particles is described in my United States Letters Patent No. 2,807,453, issued September 4, 1957, for "Apparatus for Expanding Earth Materials."

The expanded perlite particles, which provide the relatively inert particulate base for the coated particles, have surfaces comprised primarily of thin-walled, principally microscopic, glassy bubbles, some of these bubbles being sealed, and many of them being fractured. The walls of these bubbles are very thin, many of them being in the general order of one ten-thousandth of an inch in thickness. The glassy, bubbly nature of these expanded perlite particles extends throughout the interiors of the particles. The bubbles which are not fractured are actually tiny vacuum cells, because of the fact that they were blown up by expanding water vapor and possibly other gassy constituents of the perlite when the perlite was heated during the expanding process, and these gases condensed or constricted when the fully expanded perlite particles became cool.

No other known particulate material has a physical structure which is at all like the expanded perlite particles just described, and because of this distinctive structure of the expanded perlite particles they have certain unique functional aspects which make them far more useful for supporting active materials for assisting in plant growth than other types of particles heretofore employed by others, such as greystone, brick or quartz granules, exfoliated vermiculite particles, and others. Briefly summarized, the unique functional capabilities of the expanded perlite particles are: (1) Their surface portions have extremely high capillarity so that both non-viscous and viscous liquids are strongly attracted to and held in the very irregular, bubbly surface regions of the particles, and with the particles pre-heated in the preferred manner as described above such liquids are sucked into and generally will fill all pores exposed to or communicating with the surfaces, particularly where the liquid has a wetting agent component. Thus, after the expanded perlite particles are coated, the strong retention bond between the base particles and the coating, and also the strong capillarity for soil moisture and for the moistened coating, result in a much longer lasting and better controlled distribution of the active material in the coating. (2) Their surfaces include a vast amount of surface area, which permits the base particles to hold large quantities of materials thereon. (3) The expanded perlite particles are very low in density, ranging from about 1½ pounds per cubic foot for the fines and thin-section particles up to about 10 pounds per cubic foot for larger particles, as compared with densities for rock products of on the order of 75 to 120 pounds per cubic foot. This low density bulk of the perlite particles permits much more controlled distribution in the soil than is the case with the high-density rock-like particles employed by some in the prior art, thus permitting more economical and effective use of high-priced minerals, both chelated and unchelated, and enzymes and hormones. (4) Despite this very light weight of the perlite particles, they have very good structural strength, due to the inherent structural strength of the integrally joined globular cells of the material forming the internal construction; this structural strength of the expanded perlite particles is in an entirely different order of magnitude than the flaky, accordion-like construction of exfoliated vermiculite particles heretofore used by some others, exfoliated vermiculite readily becoming crushed and to a large extent inoperative during attempts to impregnate the necessary carriers which would be required for controlled solubility or during use in the soil. (5) Because of its very low density, only a relatively small amount of heat is required to heat the expanded perlite particles up to temperatures required for proper coating and drying, whereby relatively low temperatures may be used, which will not destroy enzymes and the like. (6) Once heated, the perlite particles retain their heat well, dissipating it only very slowly, because of the self-insulating quality of the tiny vacuum-bubble cells throughout each particle, this heat retention permitting a coating on the particles to set and harden without requiring excessive temperatures or agitation. (7) Thin section and fine expanded perlite particles, in the range of about minus 20 plus 100 mesh have the characteristic, when not coated too heavily, of becoming electrostatically charged through frictional interaction between the particles, this quality being such as to cause the particles when coated with a holding material as set forth hereinafter containing insecticides, fungicides or herbicides to adhere in operative position to plant leaf, stem or root structures when dusted thereon. (8) In the case of fritting, where the particles are first coated with a fritting formula for various solubility frits as hereinafter described, the light surface density of the thin glass sections to which the coating adheres permits proper fluxing and fritting at considerably lower temperatures than with conventional fritting to solid glass, stone, brick, clay or other particles.

Referring again to the apparatus of FIGURE 1, the passage of the hot gasses to the right through expansion area 24 carries the fine expanded perlite particles through a transversely placed screen 26 disposed across a large proportion of expansion area 24, and out of expander unit 20 through mechanism which will be hereinafter more fully set forth.

Screen 26 is angularly disposed within expander unit 20 so that the coarse expanded perlite particles which are trapped by screen 26 will fall, vibrate or roll down screen 26 to a conveyor 28 which picks up the coarse particles and removes them from expander unit 20. A shaker motor 30 is connected to screen 26 by means of the shaker chain 32, and this mechanism sufficiently agitates screen 26 to keep a continuous flow of coarse particles on the conveyor 28.

A coarse particle elevator 34 receives the coarse expanded perlite particles from conveyor 28 and carries them upward to a bin 36 having a trommel screen classifier 38 in its upper portion.

The expanded perlite particles then pass through a dump valve 40 to the lower portion of bin 36 which, if desired, may constitute a vacuum chamber 41 in which a partial vacuum is produced by means of a vacuum pump 42 which is connected to chamber 41 through vacuum tube 44. This partial vacuum tends to assist impregnation of the surface-communicating pores of the expanded perlite particles by reducing the pressure within the pores of the individual particles so that when the hereinafter described materials are sprayed on the particles in a chamber at a higher pressure, the sprayed materials will tend to be sucked into the surface-communicating pores of the expanded perlite particles.

A feeder valve 46 connects chamber 41 with a feeder tube 48. The particles are moved through feeder tube 48 by means of a helical rotor 50 longitudinally disposed through tube 48 and driven by a motor 52.

The particles are deposited in the upper end of impregnating chamber 54 by rotation of feeder rotor 52, and the particles are distributed throughout impregnating chamber 54 by means of a ridged, conical distributor 56 which continually rotates. Integrally attached to conical distributor 56 are scraping bars 58 which are complementary to the cylindrical side walls of impregnating chamber 54 and the conical lower walls of chamber 54. Axles 60 are attached to the upper end of distributor 56 and to the lower ends of scraping bars 58 and are mounted in bearings 62. A drive motor 64 is operatively connected to distributor 56 and bars 58 through drive connection 66 to cause continuous rotation of distributor 56 and scraping bars 58.

Scraping bars 58 keep the particles and the injected slurry of material from sticking to the edges of impregnating chamber 54, and also serve to mix the particles and the material which is applied to them.

I provide one or more injection nozzles 68 which are disposed within impregnating chamber 54. A suitable combination of the materials to be injected into chamber 54 for being coated onto the expanded perlite particles is provided to nozzle 68 by means of pipe 70. Pipe 70 is connected through a line 72 which contains a pressure pump 74 and a manual shut-off valve 76 to a tank 78 containing a slurry of my active and holding materials as hereinafter described in detail.

My holding material which is included in the composition in tank 78 is a substance which, after being processed on the particles, will dissolve in water at a controlled rate and have adequate chemical holding characteristics. One suitable holding material is an inert soluble cellulose such as methyl cellulose which may be satisfactorily used in a solution of between about .3 and about 5 percent, and preferably about .6 percent. The strength of the solution permitted will be actually governed to a considerable extent by the amount and type of wetting agent used, as hereinafter described. If methyl cellulose is one of the components of the holding solution within tank 78, then it is desirable to heat the solution in tank 78 to approximately 110° F., and preferably to not greater than 150° F. so that it may readily be mixed with the active material and injected through nozzles 68. Mixing and heating of the composition in tank 78 may be accomplished by steam if desired.

It has been found in practice that the methyl cellulose carrier is most particularly suitable as a carrier for insecticides, fungicides, herbicides, hormones and enzymes. The methyl cellulose will hold up to 60 times its weight in active materials and it is practical to utilize a methyl cellulose composition holding about 6 times its weight in enzymes for measured applications of the enzymes.

Another suitable holding material is finely ground lignite, which is preferably formed into a flowable paste or slurry by steaming or by mixing with a minimum amount of water to get the proper consistency. Lignite has, in laboratory and field tests, proven to be a particularly desirable carrier when coated onto the expanded perlite particles for many applications of the final product, although the methyl cellulose is most effective as a dielectric carrier for herbicides, insecticides and fungicides where the product is to be distributed by dusting onto and being electrostatically adhered to plants.

Lignite in its natural state contains many active ingredients in desirable proportions which are helpful to plant growth, including micronutrients. Lignite has as its major ingredients about 24% water, 18% ash and 57% organic matter, with micronutrient ingredients including about 1% iron, $\frac{1}{10}$% titanium, $\frac{1}{10}$% magnesium, $\frac{5}{1000}$% strontium, $\frac{5}{1000}$% copper, $\frac{1}{1000}$% manganese, $\frac{1}{1000}$% boron, $\frac{1}{1000}$% nickel, $\frac{4}{1000}$% water soluble potash, $\frac{7}{10}$% nitrogen, 3.2% aluminum oxide, .3% sulfur trioxide, and .45% calcium; and having a pH of about 3.5 which is excellent to help correct soil alkalinity and to help keep the minerals and hormones in good shape. This pH factor of the lignite also counteracts alkalinity of the perlite itself. The lignite will effectively carry from 1 to 2 times its own weight of additional active materials, such as micronutrients, soil amendment materials, plant foods, insecticides, herbicides and fungicides, and loading of the lignite carrier on the expanded perlite particles is normally in the order of about 100% of the weight of the expanded perlite.

The methyl cellulose and lignite may be used alone or combined.

A third holding material is a suitably dehydrated and processed sea kelp, preferably of the California type (*Macrocystis pyrifera*). This is preferably dehydrated to about one tenth its original volume, then ground to particles of one-fourth inch or less in size, then steamed to heat the mass up in a moist, gelatinous state for mixing into my composition. Although this steamed kelp can be employed alone as a holding material, it is preferably used with either the methyl cellulose or lignite, or both.

The kelp is a particularly desirable holding material in that it contains iodine and other micronutrients, and also about fifteen percent organic potash, an excellent plant food.

A fourth type of holding material, which is normally employed in combination with one of the other three types heretofore mentioned, is activated sewage sludge.

A fifth type of holding material, which is closely related to methyl cellulose and which is more economical than the methyl cellulose, is a sulfide paper pulp liquor conditioned to have a pH in the range of from about 5 to about 8, and which is evaporated to the desired viscosity.

It is to be understood that the holding material may be so viscous in nature that it must be deposited in the mixing chamber by means other than that shown in the drawings, which is within the scope of this invention.

While the above described holding materials provide controlled delay in the distribution of the active materials contained therein, the delayed action may be further controlled by including in the mixture a small percentage of urea formaldehyde and its hardening agent ammonium sulfate. The urea formaldehyde may be used with any of the aforesaid holding materials or combinations thereof. When mixed with lignite, the holding material composition is preferably thoroughly mixed in the presence of steam to form the holding material paste, and then the ammonium sulfate hardening agent is mixed in. The urea formaldehyde is set in the final drying stage by temperature alone (where temperatures up to about 300° F. may be used without injury to any of the ingredients); or by temperature (as low as 90° F.) and pressure (50 p.s.i. to 200 p.s.i.) which may be applied in a tablet machine. The lower temperature and pressure polymerization or setting of the urea formaldehyde prevents damage to organic enzymes or hormones or other ingredients which are vulnerable to high temperatures and hot air blasts.

The solubility of the final pellets or particles may be accurately controlled by varying the amounts of urea formaldehyde and its setting agent ammonium sulfate. For relatively high solubility of the final particles (e.g., minimum solubility of about 50% from one watering) it is satisfactory to use .1% urea formaldehyde with .05% ammonium sulfate. For relatively low solubility (e.g., minimum solubility of about 50% from three waterings) it is satisfactory to use .3% urea formaldehyde and .15% ammonium sulfate.

If a complete delay is desired before the mixture of active material and holding material is in contact with the soil to commence its decomposition process, urea formaldehyde may be sprayed, in solution with ammonia sulfate, as an outer coating to seal the exterior of the particles. For example, a solution including up to 1% urea formaldehyde and .3% ammonium sulfate may be sprayed on the heated pellets or particles (heated to at least 200° F.) and then circulated in a hot air blast of about 300° F. to give a seal which will cause up to 1 month in delay (depending on the pH of the soil and the water applications and temperatures) before active material is released from the particles.

Initial delays can also be accomplished by providing an outer coating of holding material which is not combined with active material.

My active materials for the improvement of plant growth which I combine with one or more of the foregoing holding materials may be roughly grouped as follows.

(*a*) Soil amendment materials, including:

(1) Enzymes.
(2) Hormones.
(3) Micronutrients.
(4) Chelating and chelated materials.
(5) pH adjusting materials.

(*b*) Herbicides, fungicides and insecticides: Although the foregoing are my presently preferred active materials for the improvement of plant growth, it will be understood that any plant food, organic or inorganic, may be included as a part of my active material. Examples of some suitable organic plant foods are bat guano, castor bean meal, urea, seaweed and sewage sludge.

Normally, the herbicides, fungicides and insecticides will be provided in separate particles from the other active materials, due to the different methods of application. Any combination of one or more of the soil amendment materials and organic plant foods may be included in the same particles. However, I prefer to provide three types of particles having different solubility and time of distribution when applied to the soil, whereby when all three groups are combined and applied together to the soil a first group of the particles will act first, a second group will then act, and a third group will act finally, providing a chain reaction of events. The first group will contain soil amendment materials to first impregnate the soil with enzymes, hormones, micronutrients and other chemicals such as chelating and chelated materials, and the like, to first improve the natural plant environment, neutralize alkaline soil conditions and otherwise properly condition the soil for plant growth. The second group will carry mild organic plant foods to stimulate root growth after preliminary conditioning has started. The third group will carry herbicides, fungicides or insecticides to prevent interference with the plant growth stimulated by the other particles.

I will now describe my preferred soil amendment active materials for assisting plant growth in greater detail.

An excellent enzyme is a commercial enzyme known as "Hydrozone," provided in dry crystalling form or in liquid solution. Ten oz. of dry crystals in water to equal a total of one gallon is normally sufficient to cover one acre of land. The prior art method of distribution was to dilute this solution from 100 to 200 to 1 and spray, or even to put into irrigation water.

This and other similar plant enzymes are very expensive and this conventional method of applying is extremely wasteful, as a large percentage is lost by drainage, and very little is provided directly to the required region of the plant roots. Also, the enzymes are applied too quickly to the soil by the usual procedure, so as to waste much of them and to require frequent expensive applications. Further, being hygroscopic, these materials are extremely difficult to store.

My delayed action particles permit such plant enzymes to be stored without having them grow, cake or get smelly due to hygroscopic action. My particles can be carefully distributed at the exact preferred location for best effect on plant roots, releasing the enzyme at the most efficient rate, and not requiring repeated applications. By applying the enzyme to the soil slowly, it permits soil pH stabilization. Thus, the "Hydrozone" enzyme, when applied through my particles, will lower soil pH from 8 or 9 to a stable value of approximately 7 in the root areas, penetrating insoluble alkalis tending to pack around plant roots to permit water and food to reach the roots.

While the isolation of enzymes is in its embryonic stages and little is known about these materials, it will be apparent that my invention has a great deal of utility in this connection, and it is to be understood that the invention is not limited to any particular enzyme.

It is believed that the enzymes stimulate favorable bacteria growth to improve the plant environment.

Some types of active substances which have previously been thought to be enzymes and which are helpful to plant life now are believed by some authorities in the art to comprise bacteria or bacterial spores or products of bacteria such as antibiotics. The term "enzymes" as employed hereinafter in the specification and claims is therefore defined as including such bacteria and spores thereof and products thereof.

Various plant hormones are also useful soil amendment materials to be included in my particles. Some hormones may be applied in my particles to the root area or directly onto the roots (with the finer particles) to stimulate root and plant growth. Other hormones may be dusted in fine particles onto plant blossoms and new growth to set blossoms and stimulate plant growth and the production of better and larger fruit.

An example of a useful hormone-containing composition for combination with a holding material and coating onto the expanded perlite particles is a widely used commercial product sold under the name "Super-Thrive," which contains the hormone naphthyl acetic acid, and which also contains essential vitamins, including vitamins $B_1$ and $B_2$. Vitamin $B_1$ assists leaf growth, root development and stem cell growth, and acts to improve fruiting, proliferation, respiration, and metabolization of buds and flowers.

The enzymes and hormones are easily destroyed, and it is therefore desirable in producing my particles containing them to keep the temperature sufficiently low to prevent damage. Thus, where enzymes and hormones are employed, the heat in the mixing and drying should not go higher than 150° F., and preferably should be about 90° F.

The temperature of the expanded perlite particles should be higher than the temperature of the mixture of active and holding materials, which cuts surface tension and assists in spreading the active and holding materials over the surfaces and into the surface-communicating pores of the expanded perlite particles. By heating the expanded perlite particles to a higher temperature than the material to be coated, when they are mixed, the perlite strongly attracts and holds the coating, sucking it into the porous surfaces, instead of producing an uncontrolled, sticky mass, which is likely to result when the perlite is not hotter than the coating. However, the heat retention capacity of the expanded perlite particles is so great that this can be done at low temperatures, which will not harm enzymes and hormones. In contrast, rock-like particles will not be caused to strongly attract the coating because of the rock-like material being hotter than the material for the coating, because of the relatively smooth and limited surfaces, and because of the fact that the rock-like base particles dissipate their heat so much more rapidly than expanded perlite particles, the temperatures which would be required to achieve any such advantage would be so high as to destroy or damage enzymes and hormones.

Where enzymes and hormones are present the expanded perlite particles may be at about 200° F. when they are mixed with the active and holding materials, as the particles are rapidly cooled in the first stage of the coating process. If enzymes and hormones are not present, then the expanded perlite particles may be preferably mixed in at a higher temperature, such as at about 300° F. If the mixture of active and holding materials is not adequately coating the expanded perlite particles, then hot water can be added to the mix.

Where enzymes and hormones are present, and also where some chelating materials (hereinafter described) are present, it is important that the pH of the mix should not go below 5 or above 8, as damage would otherwise be likely to occur.

The next group of soil amendment materials is the micronutrients or "trace elements," which I include as active materials in my composition as they are essential plant elements, required in small quantities. These include iron, copper, zinc, manganese, magnesium, cobalt, iodine, boron and molybdenum.

These micronutrients may be provided as sulfates, oxides, carbonates, phosphates or nitrates, although they will usually be provided as sulfates or oxides due to availability.

If desired, one or more of these micronutrients, as oxides, may be provided in finely ground fritted or sintered form with variable solubility mineral silicates, in combination in the holding material, to slow down the release of the micronutrients and to extend the period over which they are released for active use. Some of the fritted micronutrients, and some of the more quickly available micronutrients such as those in the sulfate form, may be included together in the holding material if desired. My preferred process for producing the fritted form of trace elements is set forth hereinafter in detail.

Chelating and chelated materials are also desirable soil amendment materials to include as part of my active material composition. Chelating materials or agents are particularly useful in making micronutrients available for plant use.

Chelating agents have been found particularly useful in making iron available for proper assimilation by plants, and have also been found useful at least in connection with zinc and manganese.

Although I prefer to employ one or more chelating agents in combination with sulfates or oxides or other salts of the micronutrient elements, the chelating agents are also effective for making otherwise unavailable micronutrients found in the soil available to the plants.

For acid or neutral soils, a chelating agent abbreviated EDTA has been found effective. This is the sodium salt of ethylenediaminetetraacetic acid. However, the effectiveness of EDTA diminishes rapidly in alkaline soils.

Another chelating agent abbreviated EEDTA has been found effective in both acid and alkaline soils. This is the sodium salt of N-hydroxyethylethylenediaminetriacetic acid.

Other chelating agents are under development and test.

Chelating and chelated materials are extremely expensive, and can be made to go much farther while providing the desired plant assimilation by use of my coated expanded perlite particles.

Chelating materials when distributed in a form which is either too concentrated or uncontrolled readily burn plants, and this problem can be completely eliminated by the slow, controlled release of chelating materials from my coated expanded perlite particles. This same advantage of my invention is true with respect to insecticides, herbicides and fungicides.

pH adjusting materials may also be included among the ingredients of my active material. While my aforesaid enzymes are highly effective for adjusting and stabilizing soil pH, it may be desirable to include pH adjusting materials which act more directly. By providing such pH adjusting materials in combination with my holding material they are released to the plant regions at a suitably controlled rate for maintaining the desired pH adjustment over a long period of time. Examples of these pH adjusting materials are charcoal, an absorbent of surplus alkalis or acids, lime, for neutralizing acid soil, and iron sulfate for neutralizing alkaline soil. Others may be employed within the present invention.

As heretofore indicated, herbicides, fungicides and insecticides may also be included as active materials, but in many instances will be provided in separate particles from the other active materials due to different methods of application and the desire to often have a time delay in applying the herbicides, fungicides or insecticides which may be greater than the delay in applying the other active materials.

I have found that the thin section type of expanded perlite particles, within a particle size range of between about 20 and about 100 mesh, make excellent carrier particles for herbicides, fungicides and insecticides. The preferred holding material is methyl cellulose for this use, although lignite or a combination of methyl cellulose and lignite can be used. These small particles, through interparticle friction, build up surface charges of static electricity whereby the particles tend to adhere to plants upon which they are dusted.

For other applications of my coated expanded perlite particles, I prefer to employ expanded perlite particles in the particle size range of from about 5 to about 100 mesh, the heavy coated particles embodying expanded perlite particles running from about 5 to about 20 mesh, and the fine ones having expanded perlite particles running from about 20 to about 100 mesh.

My present invention permits greatly increased accuracy in the application of stated dosages of insecticides of the chlorinated hydrocarbon type. Combining these chemicals in my coated particles to achieve my delayed solubility action permits safe handling without danger of toxic effects. My outer particle coatings may be employed to permit neutralization of unwanted surface acids which might otherwise tend to promote internal destruction action of the particles prior to application. Thus, an outer coating of urea formaldehyde or urea formaldehyde combined with methyl cellulose prevents decomposition of the chemicals during storage and handling.

Some presently preferred chlorinated hydrocarbons are "Aldrin," "Dildrin" and "Captan."

When my particles contact the moist soil or leaf surfaces and become moist, in the case of "Dildrin" there is greater affinity within the particle for the water than the affinity of the "Dildrin," whereby the "Dildrin" is driven out onto the leaves, or into the soil for treatment of root worms or the like. In the case of "Aldrin," a vaporization of the active chemicals occurs slowly with the action of moisture on the particles and the heat of the sun when the coated particles are dusted on the leaves of the plants (e.g. corn); and this action can be timed to start promptly after sufficient time has passed for the application to be completed and for the dust to settle.

The use of "Zyoline" or other similar aromatic solvents for most of the chlorinated hydrocarbons is necessary as most of the products of this nature are insoluble in water, and such solvents permit the coatings to be spread on and dried with a minimum of heat to prevent volatilization of the active chemicals. However, some successful applications have been made using a water soluble oil with a minimum amount of heat in the particles drying operation.

Some recent developments in insecticides indicate that bacteria or spores or products of bacteria of types which are harmless to humans have been employed successfully as insecticides and can be carried in the holding material of the present invention for controlled application to plants. Accordingly, such bacteria or spores or bacterial products are included in the term "insecticides" as hereinafter employed in the specification and claims.

An example of a fungicide which I have found to be particularly useful when embodied in the coating on my particles in "Zineb" chemical fungicide.

Returning again to FIGURE 1, regardless of what active substances are used in solution in tank 78, it is highly desirable to use a wetting agent in the solution in order to permit a thorough permeation of the individual particles. Although any wetting agent will suffice, examples of suitable wetting agents are soduim laurel sulfate and silicone #200, of which only small fractional percentages are required for desired results. A wetting agent, while desirable, is not absolutely essential, particularly in cases where the expanded perlite particles can be relatively hot when mixed with the active and holding materials without damaging any of the active ingredients.

A line 88 containing a manual cut-off valve 90 connects pipe 70 to a second tank 84 which contains a slurry or solution of the holding material heretofore described. If it is desired, the active material described in connection with tank 78 may also be included in tank 84.

A flow line containing a manual shut-off valve 82 interwith tank 78 may also be included in tank 84.

Figure 1:
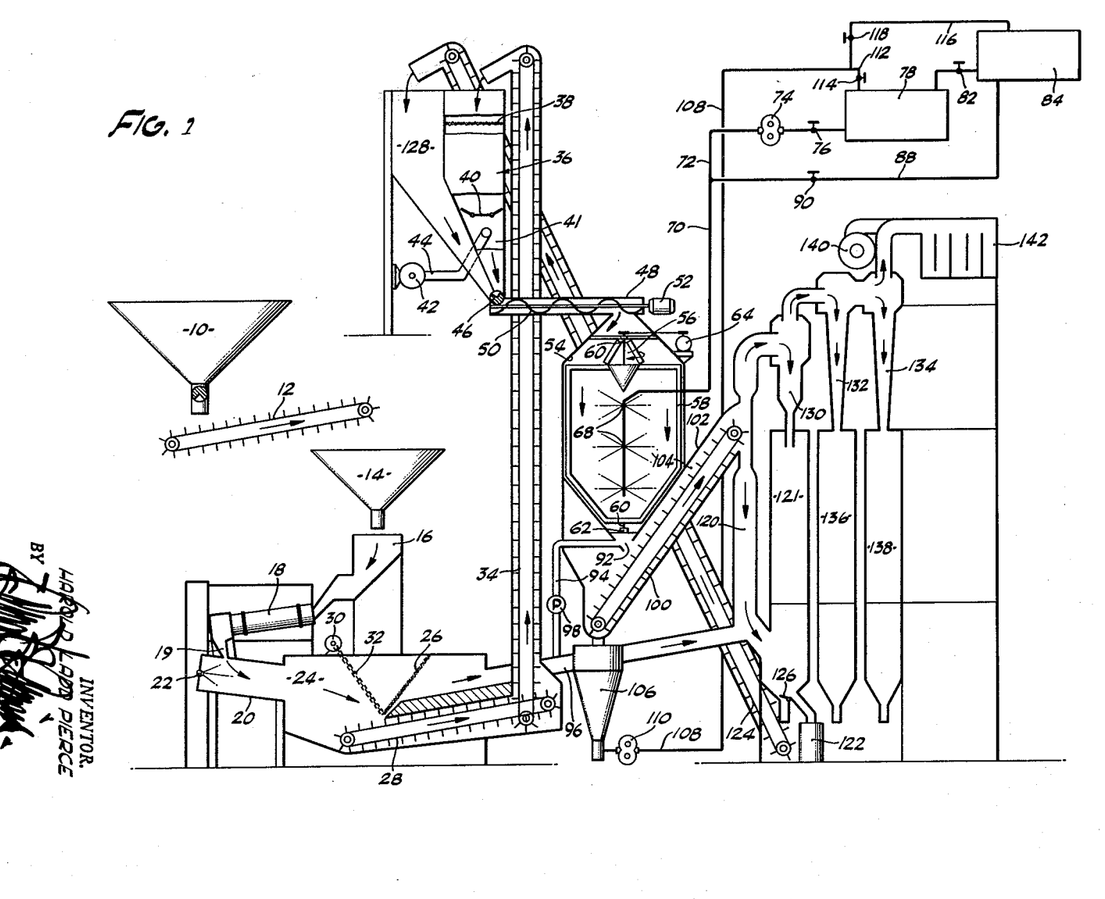

If only a single coating is to be applied to the expanded perlite particles in chamber 54, then the particles will be moved through the apparatus illustrated in FIGURE 1 in a continuous flow. However, if a separate coating is to be applied on the outside of the once-coated expanded perlite particles, the particles will be moved through the apparatus shown in FIGURE 1 in batches, and each batch will be processed in two stages by being passed through chamber 54 a second time after the initial coating has been accomplished and the coated material has been deposited and dried.

If the expanded perlite particles are only to receive a single coating, I prefer to coat them with a mixture of my active material from tank 78 and my holding material from tank 84. This is accomplished by closing valve 90 in line 88 and opening valve 82 in line 80 so that the flow of the holding material slurry from tank 84 will be directed into tank 78. The holding material and active material will mix in tank 78 and the two will be applied to the particles through line 72 in which valve 76 is open, line 70 and injector means 68.

The increase in pressure on the particles as they move into chamber 54 and the wetting agent which is included with the active material in tank 78, and particularly the reduction of surface tension because of the heat of the inert carrier particles, all assist in applying a thorough permeation and complete coating of the injected material on the particles.

My preferred method of coating and impregnating the expanded perlite particles and then applying a further outer coating to the particles in batches is to first coat the expanded perlite particles with a combination of active material from tank 78 and holding material from tank 84, and then as the batch is passed through chamber 54 the second time to apply the holding material from tank 84 without the active material from tank 78. The mixture of active material and holding material is applied to the expanded perlite particles for the first impregnation by closing valve 88, opening valve 82 and opening valve 76. The holding material is then applied by itself or with some desired active material, to give the perlite particles an outer coating thereof by merely closing valves 76 and 82 and opening valve 88.

The coated particles are removed from the lower portion of impregnating chamber 54 by means of a feeder (not shown) and a venturi consisting of an opening 92 at the bottom of chamber 54 and a tube 94 which terminates adjacent to opening 92. Hot air, preferably at about 300° F. under pressure is provided to tube 94 from the upper portion of expanding unit 20 by means of hot gas output tube 96. A venturi blower and suction pump 98 sucks hot air containing fine particles from tube 96 and blows this air and fine particles past opening 92 and into a circulating cyclone 97 around the base of chamber 54. Cyclone 97 constitutes the first of several drying stages. However, where enzymes and hormones are present in the particles the hot air should be held within a preferred range of from 90° F. to 150° F. to prevent damage. Blowing this hot air through the particles helps separate them. Final slow drying in pan dryers is often desirable.

Drying temperatures for the coated expanded perlite particles are much less than those required for coated rock-like particles, not only because the heat retention capacity of the perlite particles is far greater than that of the rock-like particles, but also because the heavy weight of rock-like particles prevents adequate agitation for drying without seriously damaging the coating, which is not a problem with the light-weight perlite particles. Thus, the coating on the expanded perlite particles can be dried and set at much lower temperatures and with better agitation than the coated rock-like particles, so as not to destroy or damage enzymes and hormones.

A conveyor 100 which is disposed inside of a conveyor housing 102 removes the semi-dry coated and impregnated large particles from the base of cyclone 97. The passage 104 in the upper portion of conveyor housing 102 permits the hot gas and fine particles to escape from cyclone 97.

A moisture trap 106 is connected to the lower portion of conveyor housing 102 so as to receive any surplus fluid which might drain out of impregnating chamber 54 or off of the large particles which are transferred by conveyor 100. Such surplus fluid (only present where the holding material is of particularly low viscosity) is pumped through return line 108 by means of a pump 110 to tank 78, tank 84 or both tanks according to the source of the material injected in impregnating chamber 54. Thus, if the material is being provided from tank 78 only to the particles in chamber 54, the material will be returned through line 108, line 112, and opened valve 114 to tank 78. At this time, return material will not be pumped to tank 84 through line 116 because valve 118 in line 116 will be closed. If, on the other hand, the material which is being injected through means 68 is solely from tank 84, any surplus material will be returned through line 108 and line 116. At this time valve 118 in line 116 would be open, and valve 114 in line 112 would be closed. If the material from nozzles 68 consisted of a mixture from both of the tanks 78 and 84, then the surplus fluid would be returned to tank 78 through line 112 and open valve 114 and no material would be returned to tank 84, as valve 118 would be closed.

Conveyor 100 deposits the coated coarse particles in the upper portion of a drying chamber 120 through which most of the coarse particles drop until they reach the lower portion of large particle recovery and storage chamber 121 through the connection between chambers 120 and 121. The second drying stage occurs within drying chamber 120. Hot gas output tube 96 from expander unit 20 is connected to the lower portion of drying chamber 120 so that hot gases which contain fine particles are directed upwardly through drying chamber 120 countercurrent to the stream of large particles which are falling through chamber 120. This completes the drying of the large particles which was commenced by the hot gasses and fine particles passing through passage 104 in the upper portion of conveyor housing 102 while the large particles were being conveyed to chamber 120 by conveyor 100.

Some of the large particles will not be as dense or as large as the particles which fall downward through chamber 120 and these particles will be blown upwardly through the upper portion of chamber 120 when they are deposited in chamber 120 by conveyor 100. These particles will be dried as they are moved through the upper portion of chamber 120, and they will be collected in a cyclone 130 which deposits them in the upper portion of large particle recovery and storage chamber 121 in which they mix with the other dried large particles.

The dried large particles may alternatively be deposited in a sacker 122 or may be dumped on the lower portion of a return conveyor 124 according to the positioning of a valve 126 in the bottom of chamber 121. If only a single impregnation or coating is to take place and the particles are continuously run through the apparatus of FIGURE 1 without batching, then valve 126 will be adjusted to deposit the large particles in sacker 122. However, if an outer coating is to be applied to the already impregnated particles, then valve 126 is adjusted to deposit the impregnated and dried large particles on the lower end of return conveyor 124.

If an outer coating is to be applied to the once-coated or impregnated large particles and they are deposited on return conveyor 124, they will be dumped at the upper end of conveyor 124 into a return bin 128 which communicates with feeder tube 48 through feeder valve 46. The outer coating is then applied to these particles in the same manner as the application of the original coating or impregnation and the particles are also dried in the same manner as the originally coated or impregnated particles.

A series of cyclones 132 and 134 are connected to the upper end of drying chamber 120 and serve to catch the fine particles and deposit them in respective recovery and storage chambers 136 and 138.

An exhaust blower 140 assists in keeping a continuous flow of air through the system and also keeps the pressure within the whole system below atmospheric pressure. Dust which by-passes cyclones 132 and 134 is blown by exhaust blower 140 into a bag-house 142.

Figure 2:
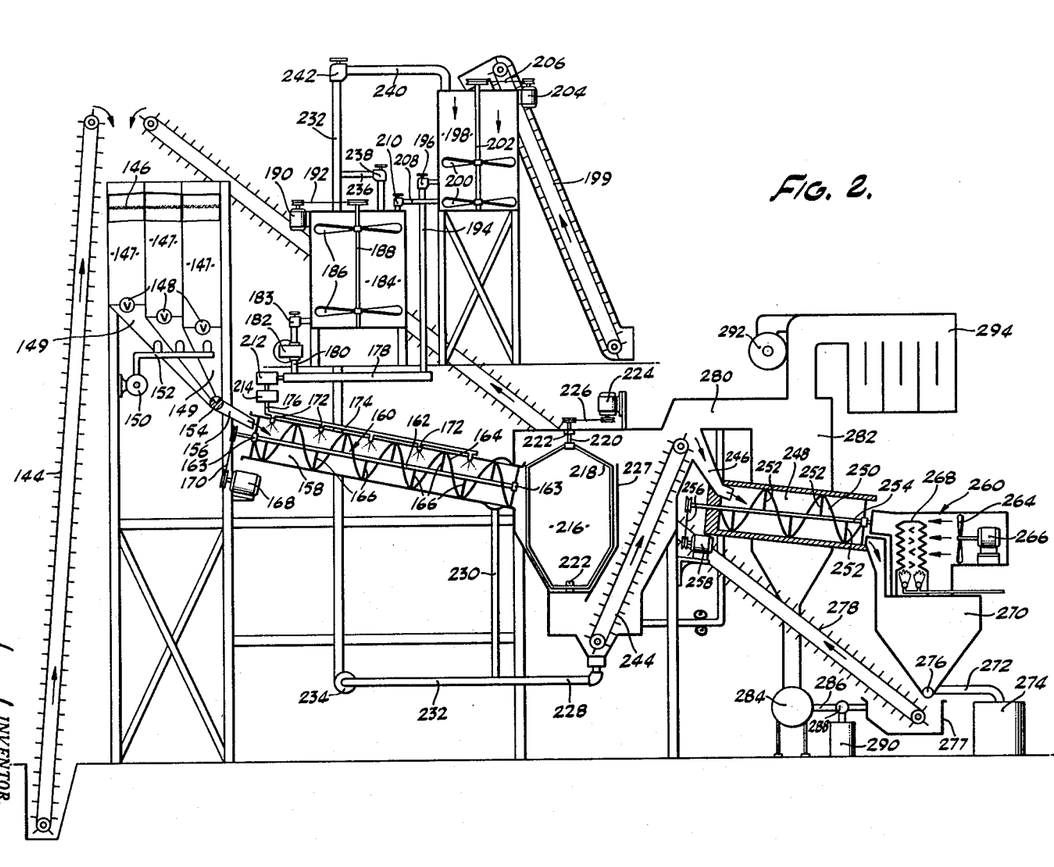

Referring now to FIGURE 2 of the drawings, I have there shown a second embodiment of my particle processing apparatus. The apparatus shown in FIGURE 2 differs from that shown in FIGURE 1 in that FIGURE 2 is illustrative of a presently preferred impregnating chamber construction, and also of the means for drying the particles and apparatus for completely processing the fine particles as well as the coarse particles which were processed in the apparatus shown in FIGURE 1.

The expanded perlite particles which are to be processed by the apparatus shown in FIGURE 2 are already pre-heated and expanded in the manner described in connection with FIGURE 1. The unique arrangement of parts in the apparatus shown in FIGURE 1 considerably raises the efficiency of production of my coated or impregnated particles whenever the particles have to be expanded in an expander unit 20 which has a hot gas output by utilizing this hot gas output to perform the drying operation on the coated particles. A separate heating unit is provided in the apparatus shown in FIGURE 2 because the expanded perlite particles wihch are impregnated in the apparatus shown in FIGURE 2 are already expanded.

The expanded perlite particles are introduced into the apparatus of FIGURE 2 by means of an elevator 144 which dumps the particles into the classifier 146 which sizes the particles and places them in a plurality of bins 147. A plurality of dump valves 148 which are associated with the respective bins permit the particles of various sizes from bins 147 to be selectively introduced into a plurality of respective vacuum chambers 149 in which a partial vacuum is created by means of a vacuum pump 150 which is connected to chambers 149 through vacuum tube 152.

A feeder valve 154 permits the expanded perlite particles from chambers 149 to pass through tubular feeder 156 which heats the particles to the same temperatures as set forth hereinabove relative to the apparatus of FIGURE 1, and conveys them to tubular coating chamber 158, preferably a glass lined chamber.

The chamber 158 forms part of a ribbon type mixer which also includes a helical or screw mixing member 160 which is longitudinally disposed within tubular coating chamber 158 to mix the particles as the slurry of active and holding materials is introduced within chamber 158 and also to move the particles from the input end to the output end of chamber 158. Mixing member 160 comprises an axle 162 which is centrally supported within chamber 158 on bearings 163. Helical vane or ribbon 164 is attached to axle 162 by means of a plurality of supporting rods 166, and vane or ribbon 164 is rotated in a direction to move the particles from the input of tubular coating chamber 158 to the output thereof by means of a motor 168 which is operatively connected to shaft 162 by means of a drive belt 170 or any other suitable mechanical connection.

One or more injection members 172 are disposed on the inside of chamber 158 and are provided with the slurry of active and holding materials by a slurry distributing chamber 174. Chamber 174 is connected through flow lines 176, 178 and 180 to a reservoir 184 which contains the active material as heretofore described in detail. A fluid pump 182 assists gravity in conveying the material from reservoir 184 to injection members 172, and a manual shut-off valve 183 is provided in line 180 to cut off the flow of material to injection members or nozzles 172.

I provide one or more mixing vanes 186 within reservoir 184 which are integrally attached to a centrally disposed, rotatively mounted shaft 188 which is driven by a motor 190 through a suitable mechanical connection 192.

A flow line 194, containing a manual shut-off valve 196 connects flow line 178 to a second reservoir 198. Reservoir 198 contains the holding material as heretofore described in detail.

If it is desired, a conveyor 199 may be provided to lift fluid or solids to be dissolved up from a suitable source to the input opening or reservoir 198. A similar conveyor (not shown) may be provided in connection with reservoir 184.

One or more mixing vanes 200 are mounted on a shaft 202 that is centrally positioned within reservoir 198 and driven through a suitable mechanical connection 206 by motor 204.

A flow line 208 containing a manual shut-off valve 210 inter-connects reservoirs 184 and 198.

Valves 183, 196 and 210 may be adjusted in the same manner as the corresponding valves 76, 90 and 82, respectively, of FIGURE 1, to alternatively provide the particles with a combination of active material and holding material, or successively with a combination of active material and holding material, and then an outer coating of the holding material. I provide a pressure regulator 212 which regulates the pressure at injection nozzles 172 and a flow meter 214 to indicate the rate of flow of the materials, both regulator 212 and meter 214 having connections to line 176.

After the particles have been coated in tubular coating chamber 158, they are deposited within a drying chamber 216 which communicates with the output end of chamber 158. The first of two drying stages is accomplished in chamber 216 within the drying temperature ranges heretofore described.

A scraper 218 is rotatively mounted in drying chamber 216 on axles 220 which are supported in bearings 222. Scraper 218 is driven by means of a drive motor 224 which is mechanically coupled through linkage 226 to the upper axle 220. Scraper 218 continuously cleans the walls 227 of drying chamber 216.

The lower portion of drying chamber 216 funnels down to a narrow aperture which communicates with a surplus fluid drain pipe 228. Another surplus fluid drain pipe 230 communicates with the lower, or output end of tubular coating chamber 158, and pipes 228 and 230 join in pipe 232 which contains a fluid pump 234.

A fluid line 236 connected to pipe 232 and containing a manual cut-off valve 238 returns surplus fluid to reservoir 184 if the fluid came from reservoir 184. When valve 238 is open so that fluid is returned through line 236, the manual cut-off valve 242 in line 240 which connects pipe 232 to reservoir 198 is closed. If the fluid came solely from reservoir 198, valve 238 is closed and valve 242 is opened to permit the return fluid to be conveyed through line 240 to reservoir 198.

The fluid return system just described is useful only in some circumstances where the materials are not too viscous in nature.

The coated particles which have been subjected to the first stage of drying in chamber 216 are picked up in the lower portion of chamber 216 and are deposited in a chute 246 by means of a conveyor 244. Chute 246 conducts the coated particles into final heating chamber 248 which is cylindrically shaped to contain a helical ribbon type mixing vane 250. Mixing vane 250 is integrally attached through a plurality of connecting rods 252 to shaft 254 which is axially mounted within final heating chamber 248. Helical mixing vane 250 is rotated to move the particles from the input end of chamber 248 to its output end by means of a drive connection 256 which inter-connects shaft 254 and motor 258.

A hot air blower unit 260 contained in a housing 262 is operatively associated with the output end of heating chamber 248. A fan 264 driven by a motor 266 blows air over a heated element 268 and this hot air is forced through final heating chamber 248 counter-current to the direction of motion of the particles through chamber 248. The heat in this hot air is not completely dissipated within heating chamber 248, so that when this hot air is blown up through chute 246 and into the first stage drying chamber 216, circulation of this hot air within chamber 216 with a circulating, circular cyclonic action will partially dry the coated particles.

A storage bin 270 receives the completely dried particles from the output of final heating chamber 248. A conduit 272 connects bin 270 with a sacker unit 274. A valve 276 in the bottom of bin 270 permits the dried particles to alternatively be deposited through conduit 272 in sacker unit 274 or to be deposited in return conveyor receiving chamber 277 from which they may be picked up by return conveyor 278 which again dumps the particles into trommel classifier 146.

The particles which have been subjected to an initial drying stage in chamber 216 that are too light to drop through chute 246 into heating chamber 248 against the hot air current pass out of chamber 216 up through a tube 280 which conveys them to a cyclone 282. These particles include both the fine particles and the dust particles. Cyclone 282 will separate the fines from the dust particles, and the fines may be dropped into a tablet or pellet forming device 284 which is connected to the bottom of cyclone 282. Tablet or pellet forming device 284 may comprise any tablet or pellet forming means, such as an extruder or pellet drum means, and compresses a plurality of the coated, dried fine particles into tablets or larger particles or pellets of any desired size, these being removed from device 284 through output conduit 286 and valve 288. Valve 288 may be adjusted to alternatively deposit the tablets or particles in a sacker 290 or in the return conveyor receiving chamber 277 from which they are picked up by return conveyor 278 and deposited in classifier 146.

While tablets or large pellets may thus be formed by compressing together a plurality of individual expanded perlite particles coated with my active and holding materials, it is to be understood that similar tablets or large pellets may be made by merely mixing a plurality of inert carrier expanded perlite particles together with my holding material and active material composition, and then forming same into tablets or large pellets in a suitable tablet or pellet forming means.

The dust particles, which are not settled out by cyclone 282, are sucked out of the upper portion of cyclone 282 by the venturi action of an exhaust blower 292 which then blows the dust into a bag house 294.

If only a single coating of the expanded perlite particles is desired, valves 276 and 288 will be so adjusted that the large and fine particles will be respectively deposited in sacker units 274 and 290. However, if an outer coating is to be applied to the coated particles after they have been initially coated, then valves 276 and 288 are adjusted to deposit the large coated particles from bin 270, and if desired, a plurality of particles in tablets or composit large pellets from forming means 284, in return conveyor receiving chamber 277.

Figure 3:
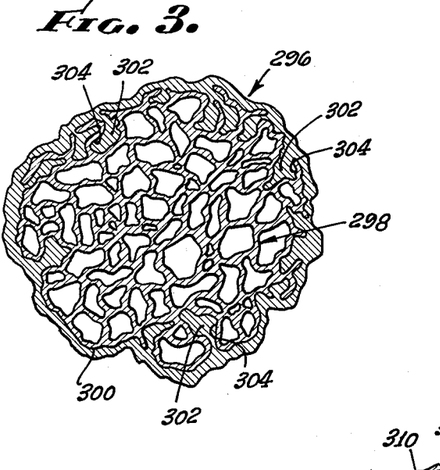

FIGURE 3 of the drawings illustrates a completely processed particle 296 which consists of an expanded perlite particle and a coating or impregnation 300 which is a combination of my active and holding materials, as heretofore described. The particle shown in FIGURE 3 is of necessity only diagrammatic, as it is impossible to show by means of a drawing the thin-walled, principally microscopic, glassy bubbles, some of which are sealed, and some of which are fractured. However, the general manner in which the coating permeates the surface-exposed pores, but is excluded from the sealed internal bubble cells is shown in FIGURE 3.

By adjusting the proportion of holding material to active material which is used in coating and impregnation 300, the rate at which the active material will be distributed in the soil or plants may be accurately controlled. This is for the reason that a coating and impregnation 300 having a relatively small percentage of holding material will dissolve to distribute the active material to the soil or plants much more rapidly than a coating and impregnation 300 which has a relatively large percentage of holding material.

Thus, if it is desirable to have the active material act over a long period of time, a relatively large percentage of holding material may be placed in coating and impregnation 300 so that the active material will be distributed in the soil or on the plants slowly and over a long period of time. On the other hand, if the active material is to act over a relatively short period of time, a relatively small percentage of the holding material may be used in coating and impregnation 300 so that the coating and impregnation 300 will readily dissolve to distribute the active material over a short period of time.

By using a relatively large percentage of holding material in coating and impregnation 300, a highly concentrated active material may be used, even though a material of this character would burn or otherwise injure the plants if it were to be used alone. By using the relatively large percentage of holding material in coating and impregnation 300, the concentrated active material will dissolve slowly so that only small amounts of it will act on the plants at one time.

Also, since my active materials are distributed in much greater bulk than when attempts are made to distribute them directly or in combination with heavy, rock-like carrier particles, it is possible to accurately certify the quantity of micronutrients or other materials distributed per acre. For example, certification of micronutrients to an accuracy of .1 lb. per acre is readily accomplished.

Because of the highly porous and irregular surface configuration of my expanded perlite particles, and the high capillarity and tenacity with which it holds the coating, very accurate control over the rate at which the active material is released to the soil or plants is achieved. This is for the reason that part of the material which was originally coated onto the particles is distributed in the form of fillings 302 within surface-communicating ports 304 of expanded perlite particle 298. These fillings 302 are not subjected to the moisture of the soil until the outer coating itself has been substantially dissolved in the soil moisture.

A further control over the rate of release of the active material is the size of particles 296. More over-all surface area is presented to the moist soil if small particles are used than if large particles are employed, so that the coating and impregnation 300 of particle 296 will be dissolved more readily if small particles are used.

The heating of the expanded perlite particles to a higher temperature than the coating and the use of the wetting agent during the manufacture of processed particle 296 insures that a maximum number of the surface communicating pores 304 of inert carrier particle 298 will be filled with fillings 302. An additional assistance in completely filling the pores 304 is the step of reducing the pressure on the inert carrier particles just prior to their introduction into impregnation chamber 54 of the apparatus shown in FIGURE 1 or tubular coating chamber 158 of the apparatus shown in FIGURE 2.

Because of the controlled rate at which the active material is released from my coated expanded perlite particles, the particles can be situated in direct contact with plants 358 without causing injury to the plants.

The coated particles may even provide solid objects which the plant roots may become entwined in and curled about. This permits a direct application of active material to the roots themselves as soon as the active material is released from the particles. My coated particles may be positioned for such close cooperation with the plant roots by employing a mixture of my particles and seeds during seeding. By thus having the active material directly at the roots, and because of the affinity of the expanded perlite particles for water, less water is required for the distribution of the active material than in the use of old active materials, so that the use of my particles will cause plants to germinate much earlier in dry country than will ordinary active material forms.

Small plants may be moved without injury because the roots trap the moisture-laden particles and hold them while the plants are being moved.

Even after all of the coating of holding and active materials has been released to the soil, my expanded perlite particles perform a highly useful function in the soil. The expanded perlite particles tend to breathe in a manner similar to earth worms and are highly efficient in keeping the soil active.

Figure 4:
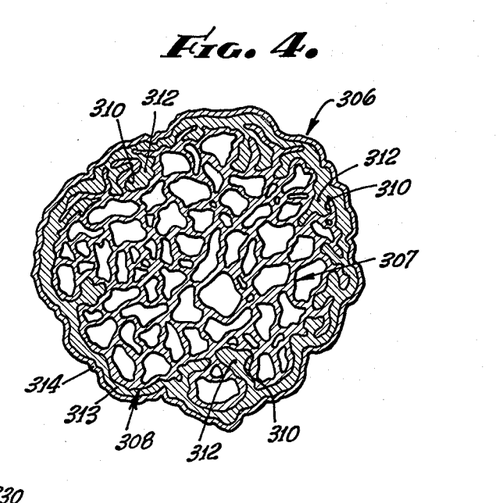

The processed particle 306 illustrated in FIGURE 4 consists of an expanded perlite particle 307 which has a coating 308 of active material alone or in combination with holding material. This impregnation and coating 308 substantially fills a large percentage of the surface-communicating pores 310 in cell 307 with fillings 312, and includes portions 313 outside of pores 310.

An outer cover 314 of holding material completely surrounds impregnation and coating 308. Cover 314 may consist of holding material alone, set urea formaldehyde alone, or a combination of holding material and urea formaldehyde.

The only difference between the processed particle 306 shown in FIGURE 4 and the processed particle 296 described relative to FIGURE 3 is the cover 314 which surrounds particle 306 in FIGURE 4. Cover 314 causes a controllable delay in the action of the active material underneath cover 314. The active material will not be released until cover 314 has been dissolved by the soil moisture. Thus, if a relatively thick or insoluble cover 314 is provided, a relatively long period of time will elapse before the active material is first released in the soil, whereas if a relatively thin or soluble cover 314 is provided a relatively short period of time will elapse before the active material begins to work in the soil.

It may be desired to combine some active material in the holding material of which cover 314 is made, whereby some preliminary active material may be released as cover 314 is dissolved prior to the application of the active material from coating 308, which will occur only after cover 314 is substantially completely dissolved.

An additional advantage is produced in cover 314 of holding material on top of the impregnation and coating 308 of active material combined with holding material, in that the strength of the processed particles 306 is greatly increased by cover 314. For this reason, the covered particles 306 may be handled without danger of crushing.

Figure 5:
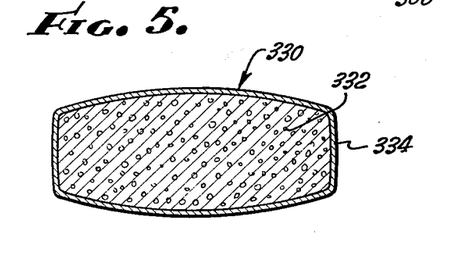

FIGURE 5 of the drawings illustrates a tablet 330 such as the tablets which are produced by tablet producing means 284 shown in FIGURE 2 of the drawings. Tablet 330 which consists of a compressed combination of my expanded perlite particles 332 and my active and holding materials, has an outer coating 334 of holding material or set urea formaldehyde, or the two combined, this outer coating being optional. This outer coating produces a tablet unit which is comparable in its action to the completed particle 306 illustrated in FIGURE 4.

As heretofore stated, my micronutrients may be provided in combination with my holding material in finely ground fritted or sinter form, thus slowing down the release of the micronutrients, extending the period over which they are released for active use and making possible more accurate distribution of the micronutrients or trace elements.

In order to produce the micronutrients in this fritted or sintered form, in which they are provided as oxides in fritted or sintered combination with silicates of varied, controlled solubilities, I prefer to frit or sinter the micronutrients with the ingredients of a conventional glaze composition onto my expanded particles, preferably expanded perlite particles. However, I vary the ingredients from those required for a complete or perfect frit or glaze, which would be substantially insoluble, so as to provide an incomplete frit or sinter containing my micronutrients, the extent of this incompleteness or imperfection in the frit controlling the solubility rate of the frit, and hence the rate of release of the micronutrients in the soil.

The expanded perlite particles thus coated with the micronutrient-containing, controlled solubility frit or glaze or sinter may be distributed as desired in the soil in whole form, or may, as heretofore described, be finely ground and mixed with my holding material.

The expanded perlite particles are peculiarly suited to receive the direct fritted coating thereon, for the reason that the expanded perlite particle surfaces are so highly insulated that the fritting can be a sudden flash fritting which will not damage the coating. In contrast, attempts to frit onto rock-like products take too long and require too much churning to heat up the particles sufficiently for fritting, so that the coating would break off or erode or dust off during the attempt to frit.

The importance of properly applying the micronutrients was shown by tests carried on by the Citrus Experiment Station for the State of Florida at Lake Alfred. In these tests the application of needed amounts of the micronutrients reduced the need for nitrogen and potash fertilizers from 2 lbs. per box of oranges to approximately .2 lb. per box and increased production more than 100% on the same acreage over a period of five years. Also, the resistance of the trees to disease and freezing was improved.

However, in these Florida tests, the micronutrients were applied by a prior art method, spraying, and were found to cost about twice as much as fertilizers and were difficult to apply due to washing away in sandy soils. Penetration in clay and heavy adobe and alkaline soils is also very wasteful with such prior art methods of application.

My present method greatly reduces the cost and improves the effects and ease of distribution of these micronutrients.

In producing my imperfect frits to provide my micronutrients carried in slightly soluble silicates, I provide variations in the fritted materials from the usual glaze compositions which not only produce varying degrees of solubility for the release of the micronutrients, but which also cause the frits to be of a low melting variety so that relatively low temperatures may be employed in the fritting and the essential ingredients will not be so likely to be damaged. I accomplish this imperfect frit condition by controlling the proportions of the sodium and potassium salts and borax, borix acid and silica oxide or flint. I have found that lime, carbon and borax will reduce the temperature of fusing of the frit.

My imperfect frit may be made by coating the imperfect glaze materials and micronutrients onto raw ground perlite ore and then pre-heating and expanding, the fritting occurring during the expansion; or, if desired, coating may occur after pre-heating and before expansion. Expansion of the perlite will occur while the frit is soft, and cooling in an air blast will prevent sticking. If desired, the already expanded perlite particles may be coated with the imperfect glaze materials and micronutrients, which may be carried in my holding material as heretofore described, and then reprocessing the perlite in the furnace at higher temperatures than the low melt glaze, with rapid cooling to prevent sticking. Since carbon must be present during the fritting, it may be provided as coke, but it also may be provided as my lignite carrier, if desired.

If desired, the frit material may include fine ground perlite to aid in the bonding. The frit may be applied by rapid heating, as heretofore stated, or by slow sintering if desired.

Using expanded perlite fines impregnated with the minerals in frit form and compressing them in tablet form for sintering with a surplus of borax to produce a heavily charged pellet is another form for my sintered or fritted materials.

It will be apparent that many other means may be employed within the scope of my present invention for providing my imperfect frit on the expanded perlite particles for ultimate soil use thereon, or for grinding thereof and mixing in with holding material for coating on the expanded perlite particles and ultimate soil use.

By containing a soluble portion, my imperfect glaze permits dissolving to start, and the solution thus formed tends to dissolve other material in the frit which would ordinarily be insoluble in water. In this way the oxides of the micronutrients are gradually dissolved and distributed.

My fritting has the added advantage of reducing the danger of poisoning of the soil from lead, antimony and barium impurities, by putting these in a form in which they are not readily absorbed due to dilution and insolubility.

The commercial frit rules for producing insoluble glazes, which rules are violated in the present method of providing slightly soluble frits, are as follows:

(1) The ratio of the acid molecules to the base molecules of a frit should never be less than 1 to 1 and never more than 3 to 1. This rule is designed to keep the frit within the limits of easy fusion. If either the base or the acid gets too high the frit will be at best, very difficultly fusible. If the temperature is raised there is an increasing tendency for the more volatile materials in the frit to be driven off, resulting in the frit being even more refractory.

(2) The ratio of the alkalies to the boric oxide in a frit should be the same as the ratio of the alkalies to the boric oxide in the glaze. Since the alkalies and the boric oxide in a glaze are the soluble constituents, this rule merely states that all of the boric oxide and the alkalies should be put in the frit. If some of the alkalies are added as feldspar, however, this need not necessarily be true.

(3) The ratio of the alkalies to the other RO oxides of a frit should never be more than 1 to 1 (R indicating mineral elements). This is to insure an insoluble frit by sufficiently crossing the alkalies by at least an equal amount of the less soluble RO oxides.

Since alkali silicate frits are soluble, it is necessary to include at least one and preferably two other oxides, which themselves make insoluble silicates, to obtain an insoluble frit. If possible, one of these oxides should be alumina.

(4) The acid element of a frit should always contain silica, and, if boric oxide is present, the ratio of the silica to the boric oxide should be at least 2 to 1. Since borates are quite soluble, the silica is necessary to decrease the solubility and thereby make a better frit.

(5) The alumina in a frit must not greatly exceed .2 equivalent. If the alumina is too high it tends to form a very viscous frit, in addition to increasing the refractoriness. Too refractory a frit should be avoided, as it may result in the volatilization of the alkalies, lead oxide or boric oxide due to the high temperature required in smelting.

I prefer to use mill run sulphide and carbonate concentrates of copper, iron, manganese, molybdenum, zinc, lead, cobalt, and magnesium for providing my micronutrients in fritted form. This use of cheaper mine concentrates in sulphide, carbonate and oxide forms can materially reduce the cost over the use of chemically pure oxides and sulphates.

By selecting the balance of minerals in areas for processing so that the fluxing of the copper, iron, manganese, cobalt and molybdenum contents will be applied onto the expanded perlite particle after the particle has been coated with the mixture of the minerals concentrate and powdered coke or lignite and boric acid to get the desired boron content; the particles are then ready to be passed through a sinter machine and fused in a sinter cake lightly bound together by proper timing so that the cake can be broken up into fused particles again.

The fluxed or sintered particles need not, of course, be fused into such a final sinter cake.

If desired, the minerals can be mixed with ground perlite and bonded in cellulose and pressed into tablet form and then sintered in the same manner as the coated expanded perlite particles. The same can be done with lignite as the holding material, or a combination of lignite and the cellulose.

In the case where lead sulphide, lead oxide, lead carbonate and zinc sulphide, zinc oxide and zinc carbonates are present in the mill run concentrates of minerals, with a minimum amount of silica, the lead and zinc can be volatilized and recovered in condensing tubes to produce a combined zinc and lead oxide. This combined oxide can be then processed by again mixing with a carrier and pelletizing with coke and a deleaded zinc and relatively pure lead oxide can be produced by the second sintering action.

Such deleaded zinc can then be used in the frit and added back into the final glazing process together with the added minerals to make up any deficit in the formula not obtained from the mine run concentrates applied in the first stage.

The presence of sulphides and sulphur from the mine run mineral concentrates in the fused coating may assist in the solubility standard desired or it can be reduced by a second sinter run in the presence of added coke dust added to the pellets by rolling the moistened pellets in drums with the coke dust.

In accordance with glazing practices in the ceramic industry, by frit material will have ingredients from three groups:

(I) Bases—the RO metal oxide group, including $Na_2O$, $K_2O$, $CaO$, $MgO$, $BaO$, $ZnO$, $FeO$, $MnO$, $PbO$, $CdO$, $CuO$, and the like.

(II) Neutrals—including $Al_2O_3$, $B_2O_3$, $Fe_2O_3$, $Sb_2O_3$, $Cr_2O_3$.($R_2O_3$ group).

(III) Acids—the $RO_2$ group, including $SiO_2$, $TiO_2$ and $ZrO_2$.

A typical empirical frit formula is:

(I) Base, RO group—.25 $K_2O$; .05 $Na_2O$; .50 CaO; .10 BaO; .05 MgO; and .05 SrO.

(II) Neutral $R_2O_3$ group—.35 $Al_2O_3$; and .125 $B_2O_3$.

(III) Acid, $RO_2$ group—3.1 $SiO_2$.

A typical batch recipe for a frit formula is as follows: feldspar, 104.44; whiting, 50.00; $BaCO_3$, 24.63; $MgCO_3$, 5.25; $SrCO_3$, 9.19; boric acid, 3.19; flint, 84.60; borax, 23.88. In a frit comprising a total of 208.00 units, excellent quantity ratios for feldspar, whiting, clay and flint are: feldspar, 55.70; whiting, 10.00; clay, 25.80 and flint, 16.32.

Flint can be scrap window glass (cullet) having an empirical formula of .50 $Na_2O$, .50 CaO and 2.50 $SiO_2$.

An example of formulas involved in the treatment of lead and iron sulfides with coke and a holding material, to illustrate the sintering operation involved in providing my sintered pellets containing the micronutrients, is as follows:

(1) $\quad C+O_2=CO_2$
(2) $\quad CO_2+C=2CO$
(3) $\quad 2PbS+3O_2=2PbO+2SO_2$
(4) $\quad 2FeS_2=2FeS+S_2$
(5) $\quad 2FeS+3O_2=FeO+2SO_2$
(6) $\quad 2SO_2+O_2=2SO_3$
(7) $\quad PbO+SO_3=PbSO_4$ Sinter action is strongly exothermic in reactions 1, 3, 5 and 6.

(8) $\quad PbS+2PbO=3Pb+SO_2$
(9) $\quad PbS+PbSO_4=2Pb+2SO_2$

Some lead silicates will be formed of oxides of lead, iron, sodium and calcium, and also low melting point silicates of variable solubilities which tend to bind the particles together in the final sinter composition.

(10) $\quad PbO+SiO_2=PbO+SiO_2$
(11) $\quad FeO+SiO_2=FeO+SiO_2$

Lead reduced by carbon and carbon monoxide to lead oxide which is volatilized, some lead being formed into lead silicates.

(12) $\quad 2PbO+C=2Pb+CO_2$
$\quad\quad\; PbO+CO=Pb+CO_2$

Sintering forms new generations of crystals, which takes place effectively without fusion and below the melting point of either of the constituents of the mixture being sintered.

Under the sintering action, the temperatures provided momentarily in the sintering process in the innumerable centers between the finely divided burning coke and metallic sulphides of combustion, are probably very high, and the supposition that subsequent new crystallization occurs is therefore believed justified.

It is to be noted that the partial fusing of the sulphides into the silicates will provide an effectively sealed charge of the more soluble trace elements for soil application after the silicate seal has been dissolved.

My present invention has opened up a whole new approach for making available to soil and plants the necessary materials for soil improvement and plant growth in the most desirable quantities, proportions and timing. My delayed action particles greatly reduce cost by providing only the correct amounts of soil amendment materials, organic plant foods, insecticides, herbicides and fungicides as required.

By gradually releasing the active materials over substantial time periods, frequent applications are not required, and intervals during which some active materials are not available are reduced or eliminated. Strong chemicals may be employed without danger to plants or to persons handling them. Shipping and storage damage due to direct exposing of the active materials to the atmosphere and to moisture is virtually eliminated.

My particles permit the necessary active materials to be broadcast at the optimum places for best results, such as directly in the root region.

With my controlled solubility particles, valuable and needed materials are not permitted to drain away through porous soils, such as the volcanic soils found in the Hawaiian Islands, where soil improvement materials normally drain away too quickly for effective and economical action.

In just the opposite situation, where the soil is of heavy clay or hard caked insoluble alkalis form a seal about plant roots, my particles penetrate such soils, stabilizing the soil pH in a desirable range, and permitting the required moisture and plant feeding and improving materials to reach the roots.

It is to be understood that the form of my invention herein shown and described is my preferred embodiment, and that various changes may be resorted to within the spirit of my invention and the scope of my appended claims.

What I claim is:

1. An article of manufacture for controlled release of an active agricultural substance during agricultural use which comprises: a multiplicity of expanded perlite particles having rigid thin-walled structures with microscopically irregular and porous glassy surfaces of high capillarity formed by a combination of steps including preconditioning raw ground perlite ore for a sufficient time at a temperature within the range of about 600° to 1200° F. to drive off enough combined water to reduce the weight of the perlite by from about ½ to about 2% without any substantial expansion of the perlite and then expanding the preconditioned perlite at a temperature in the range of about 1500° to 2200° F., said perlite particles being coated and impregnated with hardened, continuous, slowly-soluble holding material, said holding material being of a viscous character before hardening and having at least one active agricultural substance substantially uniformly dispersed therethrough, said holding material substantially completely covering the surfaces of said perlite particles and substantially completely filling the pores in said perlite particles which communicate with the surfaces of the particles to intimately and tightly bond the coating to the particles, said active agricultural substance being of the class effective in trace quantities, the slow solubility of the hardened, holding material in combination with the high capillarity of the preconditioned and expanded perlite cooperating to provide for controlled release of the active agricultural substance over a substantial period of time.

2. The article of claim 1 wherein the holding material comprises at least a major proportion of a material selected from the group consisting of methyl cellulose, lignite, sulfide paper pulp and mixtures thereof.

3. The article of claim 1 wherein different particles contain different active agricultural substances and the holding material for said different particles has different solubility characteristics providing different release times for the different active substances in the respective particles.

4. The article of claim 1 wherein said active agricultural substance is selected from the group consisting of agriculturally useful soil-conditioning enzymes, micronutrients, plant growths hormones, herbicides, fungicides, insecticides and chelating agents.

References Cited in the file of this patent

UNITED STATES PATENTS

| | | |
|---|---|---|
| 2,498,480 | Bierlich | Feb. 21, 1950 |
| 2,502,996 | Rohner | Apr. 4, 1950 |
| 2,695,840 | Leppla | Nov. 30, 1954 |
| 2,765,290 | Ziegler | Oct. 2, 1956 |
| 2,779,670 | Burkett | Jan. 29, 1957 |
| 2,791,496 | Rice | May 7, 1957 |
| 2,792,295 | Wright | May 14, 1957 |
| 2,806,773 | Pole | Sept. 17, 1957 |
| 2,904,424 | Chapman et al. | Sept. 15, 1959 |
| 2,909,869 | Dresser | Oct. 27, 1959 |
| 3,006,753 | Harvey | Oct. 31, 1961 |
| 3,034,882 | Renwick | May 15, 1962 |